May 28, 1929.  R. E. GREENBURG  1,715,128
PRESSURE GAUGE
Filed May 18, 1927
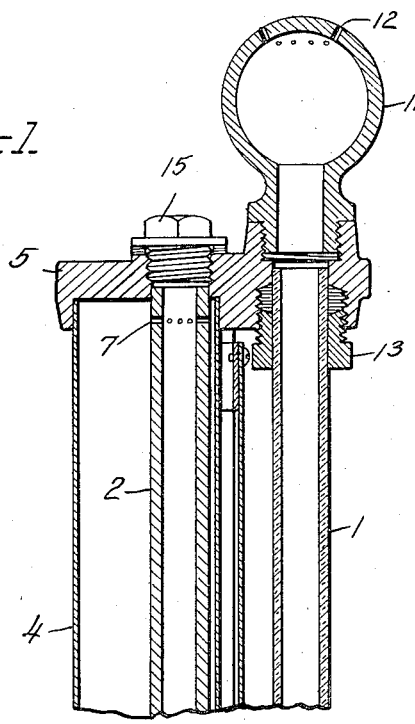
Fig. 1.
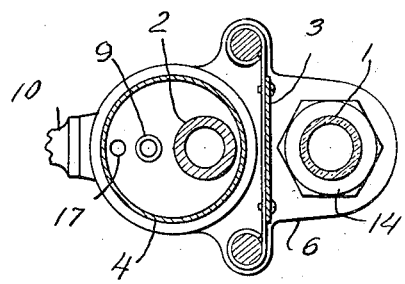
Fig. 2.
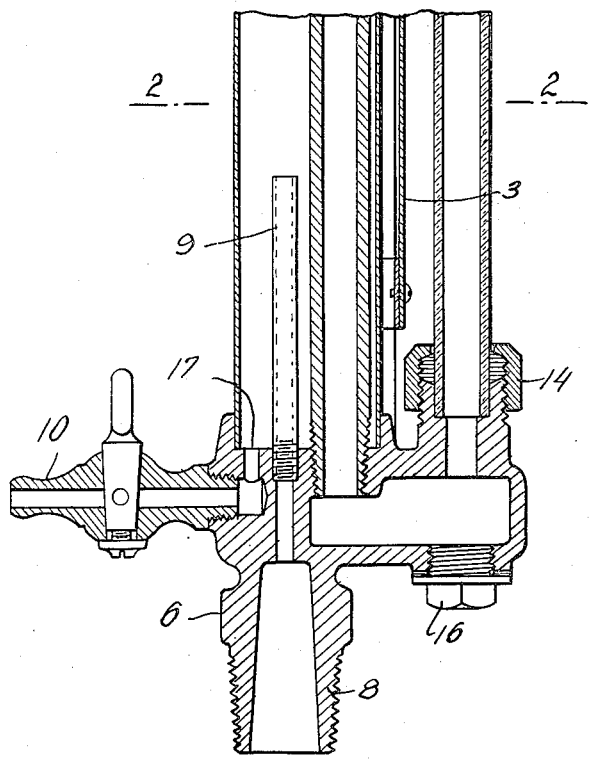
INVENTOR
Roland E. Greenburg
BY
ATTORNEYS Patented May 28, 1929.

1,715,128

UNITED STATES PATENT OFFICE.

ROLAND E. GREENBURG, OF WHITING, INDIANA, ASSIGNOR TO SINCLAIR REFINING COMPANY, OF EAST CHICAGO, INDIANA, A CORPORATION OF MAINE.

PRESSURE GAUGE.

Application filed May 18, 1927. Serial No. 192,177.

This invention relates to improvements in instruments for measuring pressures. One common form of pressure measuring instrument is the Bourdon gauge, in which the pressure to be measured is exerted on the interior of a curved tube of oval cross section, the pressure being determined by the resulting straightening effect. This type of gauge is not entirely satisfactory in all applications, for example, where the gauge tube is subjected to corrosion it rapidly loses its sensitivity and accuracy as a measuring instrument. Another common form of pressure measuring instrument is the manometer, in which the pressure to be measured is exerted upon one of two balancing liquid columns, the pressure being measured by the resulting difference in liquid head in the two columns. This type of gauge has been used with some success in applications where the Bourdon gauge has been unsatisfactory, as where the gauge is subjected to corrosion, but it also has some deficiencies. For example, in measuring the pressure of vapor mixtures or gas and vapor mixtures containing easily condensable components with a manometer, there is a tendency in the ordinary form of instrument for condensate to form and collect in the liquid column on which the pressure is exerted thus making the resulting reading inaccurate. Likewise, the ordinary form of manometer is quite fragile. This invention provides an improved manometer type of pressure measuring instrument in which any effect of corrosion upon sensitivity or accuracy is minimized, in which any inaccuracy due to such condensation is largely eliminated, which is of sturdy construction, and which has several further advantages.

In the improved manometer of this invention, the pressure is measured, as usual, by the difference in head between two balancing liquid columns within two tubes connected at their lower ends, the pressure to be measured being exerted upon the liquid column in one of these tubes. The tube containing the liquid column upon which the pressure to be measured is exerted is enclosed within a chamber through which the pressure is exerted, the upper end of this tube opening into the upper part of this chamber. This chamber is exposed sufficiently to cool and condense from the fluid the pressure of which is to be measured such condensable components as might otherwise tend to condense and collect upon the liquid column in this tube of the manometer. This tube of the manometer, being arranged within this chamber, is also maintained at a temperature preventing further condensation within the tube itself. Any condensate collecting in the lower part of the exposed chamber is discharged as necessary. Entrainment of such condensate in the fluid entering this chamber may be avoided by so introducing the fluid that it is not required to pass through any condensate which may have collected.

The invention will be further described in connection with the accompanying drawings which illustrate, in a diagrammatic and conventional manner, a pressure gauge embodying the invention, but it is intended and will be understood that this more detailed description and illustration are for the purpose of exemplification only and that the invention is not limited thereto. In the drawings:

Fig. 1 represents an elevation in section of a pressure gauge embodying the invention, and Fig. 2 is a fragmentary section on line 2—2 of Fig. 1.

Referring to the drawings, the manometer proper in the instrument illustrated consists of two tubes, 1 and 2, connected at their lower ends. The tube 1 is an exposed glass tube, the liquid level in which can be read against the scale 3. The tube 1 is arranged within a chamber formed by the tube 4, the upper fitting 5 and the lower fitting 6. The upper end of the tube 2 and the upper end of this chamber are in free communication through apertures 7. The interior of tube 4 communicates with the system, the pressure in which is to be measured through nipple 8. The passage through this nipple is extended upwardly into the chamber within tube 4 by means of tube 9. Cock 10 is provided for draining the chamber within tube 4, this cock communicating with the chamber through a passage 17 opening into the chamber below the open end of tube 9. The bell 11, having vents 12, is provided to catch and return any of the manometer liquid discharged from tube 1 by sudden or excessive rise in pressure. The tube 1 may be removed for cleaning or replacement by unscrewing this bell. The tube 1 is held in place by glands 13 and 14. The tube 2 may be removed for cleaning or replacement by means of plug 15. Plug 16 is provided for draining the manometer. Mercury is a convenient manometer liquid. It may be supplied to the manometer tubes through plug 15 or through the opening into which bell 11 is screwed. It may be removed from the manometer tubes through plug 16.

As an example, the operation of the improved manometer of the present invention as it is used in measuring the pressure of a hot oil vapor mixture may be described. The manometer being connected to the system the pressure in which is to be measured through nipple 8, the pressure of the vapor mixture in the system is exerted in the chamber within the tube 4 and, through the apertures 7, on the liquid column in the manometer tube 2. The prevailing atmospheric pressure is exerted on the liquid column in the manometer tube 1. As a consequence, the two balancing liquid columns come to an equilibrium in which the difference in head of the two liquid columns is a measure of the pressure differential between atmospheric pressure and the pressure in the system to which the instrument is connected. It will be apparent that the instrument will operate either where the pressure in the system is greater than atmospheric pressure, or where it is less. It is convenient to calibrate the scale 3 directly in pressure units, say pounds per square inch or inches of mercury pressure difference represented by the position of the meniscus in tube 1. The tube 4 being exposed to the atmosphere, the vapor mixture in the chamber within this tube is cooled and any easily condensed components of the vapor mixture are condensed, the condensate collecting in the lower part of the chamber. Such condensed oil collecting in the lower part of the chamber within tube 4 is discharged through cock 10 as necessary to maintain the level of any collecting condensate below the upper end of tube 9. Tube 9 thus provides for movement of the vapor mixture between the instrument and the system to which it is connected without requiring it to pass through such condensate. Due to the cooling in the chamber within tube 4, the vapor mixture is relieved of easily condensed components before it can enter the manometer tube 2. This condensation not only effects the removal of at least part of such easily condensed components, but also reduces the partial pressure of any such components remaining in the vapor mixture reducing any tendency to further condensation. Likewise, the tube 2 being arranged within the tube 4, further cooling within the tube 2 is largely avoided. Any temperature effect can be corrected by calibration, for example, the instrument may be calibrated originally under the temperature conditions prevailing in the application for which it is intended. This condensation affects the pressure exerted on the liquid column in the manometer tube 2 materially only to the extent that it requires flow of the vapor mixture into the instrument, and this effect can be made negligible by appropriate proportioning of the connections, nipple 8 and tube 9, or by restricting the exposure of tube 4 to reduce the flow of the vapor mixture into the instrument due to the condensation to a point where the resulting pressure drop due to flow through the connections is negligible.

I claim:

1. An improved pressure measuring instrument, comprising a pair of manometer tubes connected at their lower ends, an exposed chamber enclosing the manometer tube of this pair in which the pressure to be measured is exerted, the upper end of this manometer tube communicating with the upper part of this chamber, means communicating with a lower part of this chamber for connecting the instrument with the system the pressure in which is to be measured, and means for discharging liquid from the lower part of this chamber.

2. An improved pressure measuring instrument, comprising a pair of manometer tubes connected at their lower ends, an exposed chamber enclosing the manometer tube of this pair in which the pressure to be measured is exerted, the upper end of this manometer tube communicating with the upper part of this chamber, means communicating with a lower part of this chamber for connecting the instrument with the system the pressure in which is to be measured, and means communicating with a still lower part of this chamber for discharging liquid therefrom.

3. An improved pressure measuring instrument, comprising an upper and a lower fitting, a pair of manometer tubes arranged between these fittings and communicating through an opening in the lower fitting, another tube arranged between these fittings and forming a chamber surrounding one of these manometer tubes, a restricted opening between the upper end of the surrounded manometer tube and the upper part of this chamber, a valved liquid outlet communicating with the lower part of this chamber, and means communicating with this chamber below the opening between this chamber and the enclosed manometer tube for connecting the instrument with the system the pressure in which is to be measured.

4. An improved pressure measuring instrument, comprising an upper and a lower fitting, a pair of manometer tubes arranged between these fittings and communicating through an opening in the lower fitting, another tube arranged between these fittings and forming a chamber surrounding one of these manometer tubes, a restricted opening between the upper end of the surrounded manometer tube and the upper part of this chamber, a valved liquid outlet communicating with the lower part of this chamber through an opening in the lower fitting, means for connecting the interior of this chamber with the system the pressure in which is to be measured through another opening in the lower fitting, and a tube connected with this last mentioned opening extending upwardly within the chamber to an intermediate point therein.

In testimony whereof, I have subscribed my name.

ROLAND E. GREENBURG.